United States Patent [19]

Norton et al.

[11] Patent Number: 5,283,159
[45] Date of Patent: Feb. 1, 1994

[54] OPTICAL RECORDING MEDIUM AND METHOD FOR IMPROVED PIT GEOMETRY AND INCREASED LASER TRACKING

[75] Inventors: James R. Norton, Minneola, Kans.; David G. Loeppky; Robert B. Dobbin, both of Irvine, Calif.; Robert C. Beauchamp, Westminster, Calif.; Daniel H. Burkett, Lakewood, Calif.

[73] Assignee: Del Mar Avionics, Irvine, Calif.

[21] Appl. No.: 13,259

[22] Filed: Feb. 3, 1993

Related U.S. Application Data

[63] Continuation of Ser. No. 771,392, Oct. 3, 1991, abandoned.

[51] Int. Cl.$^5$ .................. G11B 7/24; G11B 7/26
[52] U.S. Cl. .................. 430/275; 430/321; 430/495; 430/269; 430/271; 430/945; 369/284; 369/286; 346/135.1
[58] Field of Search .............. 430/321, 495, 275, 945, 430/269, 271; 346/135.1; 369/275.4, 284, 286

[56] References Cited

U.S. PATENT DOCUMENTS

| | | | |
|---|---|---|---|
| 4,282,295 | 8/1981 | Lee et al. | 430/2 |
| 4,405,862 | 9/1983 | Bricot et al. | 250/318 |
| 4,414,273 | 11/1983 | Wada | 428/336 |
| 4,430,401 | 2/1984 | Wilkinson | 430/8 |
| 4,450,553 | 5/1984 | Holster et al. | 369/275 |
| 4,451,915 | 5/1984 | LaBudde et al. | 369/109 |
| 4,554,655 | 11/1985 | Kumasaka et al. | 369/275 |
| 4,578,788 | 3/1986 | Ahn et al. | 369/275 |
| 4,582,776 | 4/1986 | Matsui et al. | 430/27 |
| 4,650,742 | 3/1987 | Goto et al. | 430/271 |
| 4,969,141 | 11/1990 | Takaoka et al. | 369/100 |
| 4,994,354 | 2/1991 | Toibana et al. | 430/495 |
| 5,004,660 | 4/1991 | Van Andel et al. | 430/17 |

FOREIGN PATENT DOCUMENTS

| | | | |
|---|---|---|---|
| 57-189894 | 11/1982 | Japan | 430/945 |
| 58-133649 | 8/1983 | Japan | 369/275.4 |
| 62-125552 | 6/1987 | Japan | 369/275.4 |
| 2-033739 | 2/1990 | Japan | 369/275.4 |

Primary Examiner—Charles L. Bowers, Jr.
Assistant Examiner—John A. McPherson
Attorney, Agent, or Firm—J. D. Leimbach

[57] ABSTRACT

The invention discloses a method and an apparatus for creating optical disc recordings by forming pits having ideal shapes. These ideally shaped pits are improvements in the technology of disc mastering, due to the manufacturing and data playback advantages that are inherent in the ideally shaped pits. A disc substrate has a very thin partially reflective layer applied to the surface of the optical disc upon which data will be recorded. The substance used to make the partially reflective layer is normally considered opaque in more commonly occurring thicknesses. However, the partially reflective layer, is created to be so extremely thin that it becomes partially optically transparent. The partially reflective layer then has spin coated, thereon, an optically active lamina to enable the recording of data on the disc by laser means in the form of pits. The pits are created by having a laser light focusing on both the partially reflective layer and the optically active lamina, both which react to the irradiation causing a pit to be formed. The resulting pit is without a raised berm area surrounding the pit, in what is considered to be an ideal shape for a pit. An OD master can be created by finally depositing a conductive and reflective lamina over the pitted active lamina. The invention is also useful in providing increased laser tracking. Here, the partially reflective layer provides increased signal to noise ratio, enhancing laser tracking in both the recording and playback modes.

28 Claims, 5 Drawing Sheets

OPTICAL RECORDING MEDIUM AND METHOD FOR IMPROVED PIT GEOMETRY AND INCREASED LASER TRACKING

This is a continuation of copending application Ser. No. 07/771,392 filed on Oct. 3, 191, now abandoned.

BACKGROUND OF THE INVENTION

1. Field of the Invention

This invention relates to the recording of data on optical discs, and more specifically toward obtaining superior laser tracking and improved pit geometry in optical recordings created within the art of optical disc mastering.

2. Description of the Prior Art

Various methods have been employed in recording data on optical discs, wherein, data is recorded by having a laser burn pits into an optical disc. Optical disc (OD) Masters are articles from which prerecorded mass produced consumer OD's are subsequently molded. The master is a first article in the OD manufacturing process having data or information recorded on a disc or platter that can read by optical means. All subsequent OD manufacturing and duplication processes transfer that identical form, format and data from the original first article by various means including: vacuum deposition; electroforming/plating; or injection molding processes.

Past techniques for producing masters combined existing technologies from various industries. The most prominent of these techniques is the photo resist concept of the semiconductor industry. The master had formed on it a series of pits which serve to optically record information. The pits form a spiral line or track starting at the center of the disc and continuing to the outer periphery of the disc. Conventionally, the pits are approximately 0.6 $\mu$m ($10^{-6}$ meters) wide, 0.9 to 3.3 $\mu$m long, 0.12 $\mu$m deep, and are separated from neighboring tracks, on either side thereof, by 1.6 $\mu$m center to center.

To record using the photoresist technique, a lamina of photoresist material is spun upon a very smooth, polished circular plate of glass. The glass plate with photoresist lamina is then placed in an oven to cure the photoresist. The cured, photoresist coated, glass plate is next set upon a turntable which is caused to spin. A data modulated laser optical system is focused on the glass plate, while suspended by a relatively large and complex translational mechanism, to cause the focused spot laser to move very gradually, at a steady radial rate, outwardly from the center of the spinning glass plate while concomitantly radiating the surface of the plate. The affect being to produce a spiral track of data in the photoresist material. The turntable spins at either a constant angular velocity or a constant linear velocity (CLV) while any point on the surface of the plate is being radiated by a laser. This process is referred to as mastering, wherein, data is recorded by creating pits in the optical disc from the exposure to laser light along the spiral path as the plate rotates. After the desired data has been recorded in the photoresist lamina, the plate is placed in at least one bath of developing solution, typically a process that requires multiple steps, whereby, the exposed areas in the photoresist are etched out leaving a series of pits. The glass plate with etched photoresist is then oven dried, followed by metalization of the photoresist lamina by vacuum deposition of a thin conductive lamina of metal thereon, which yields the desired master. The master is finally subjected to an analysis and validation process prior to electroforming to make a stamper and replication.

The foregoing type of mastering system is quite expensive in terms of capital equipment involved, labor, space, sensitivity to motion and shock, time and costs. Operating costs to produce a single master can be relatively expensive.

As an alternative to the photoresist mastering system another technique, known as a non-photo resist (NPR), or direct offset method, utilizes what is referred to as a dry process formula (DPF). This process incorporates the use of a material which undergoes ablation when exposed to a laser, thereby, forming the desired pit has brought forth a number of advantages over the photoresist process. These advantages include a reduction in the process steps by eliminating, among others, developing and curing steps, which results in a less costly procedure and much shorter completion time, and the ability to monitor the quality of the disc concurrent with the mastering process of recording data thereon. The plate and DPF material are set upon a turntable for mastering and concomitant analysis. Metalization of the pitted layer is conducted to complete the mastering process. Once such a master is made, conventional electroplating and replication processes are accomplished to make a stamper which is then used for mass duplication of OD's by conventional injection molding processes. The NPR system makes some improvement over the prior art largely due to eliminating etching processing and oven-curing but it does not eliminate motion sensitivity nor the need for expensive and complex translator mechanisms and the glass reconditioning processes. Capital expense for such systems is still substantial, and the cost to produce a single master is still relatively expensive.

Yet another mastering process is referred to as a direct metal mastering (DMM) process. In the DMM process, instead of using a laser to either expose or cause ablation of the surface material, a tiny diamond stylus actually engages the surface, usually metal, and gouges the pits. Although technically feasible, this concept has had no meaningful application in industry because the "no contact" laser systems offer inherent increased reliability, longevity and efficiency over mechanical systems.

A major objective in recording optical disc masters is to control the geometry of the pits used to record data on the disc. Poor pit geometry makes the separation of duplicate discs from the disc stampers difficult. Also, data transmission can be affected by pits having raised areas surrounding the pit called berms, which are a common result in the dry process formula. An ideal pit is one formed without a surrounding raised berm area. Much modern research and development has been devoted to creating recorded optical discs having such ideal pits. However, the conventional techniques, discussed above, have not developed a manner of recording optical discs without generating the undesirable berm areas surrounding the pits used to record data.

As can be see from the forgoing discussion, the prior art possesses inherent limitations, and there continues to be a long standing need for a more efficient, less time consuming, and less expensive method for manufacture of an OD Master, that is effective in controlling pit geometry. The invention disclosed herein does just that.

SUMMARY OF THE INVENTION

The invention is a method and apparatus useful in recording data on and in the manufacture of optical discs, wherein, laser tracking is improved and pits, used to record data, have their geometry controlled in a simple, effective and inexpensive manner. The invention utilizes an optically transparent (either polycarbonate or glass) disc substrate having an optical tracking groove molded or etched on a side, thereof. While in a clean room environment, a very thin layer (on the order of 30 to 50 Angstroms) of a substance having different optical characteristics from that of the disc substrate is applied to the grooved side of the substrate, such that partial reflectivity is obtained. An optically active lamina is then spin coated on top the partially reflective layer. The active lamina is encoded with data by laser means configured to focus a data modulated beam along the tracking groove causing ablation and/or consumption of the optically active lamina. The partially reflective layer has an index of refraction that is different from either the disc substrate or the optically active lamina, which both have a similar index of refraction. Thus, a laser can more effectively track the junction area between the optically transparent disc substrate and optically active lamina layer due to the optical feedback received from partially reflective layer.

The desired pit size and geometry is achieved by selecting the laser power in conjunction with the thickness of the partially reflective layer. The partially reflective layer affects the characteristics of the exothermic reaction when the optically active lamina is subjected to a focused laser. While the laser is focused on optically active lamina creating heat, the partially reflective layer will also be focussed on by the laser, and will cause additional heat to be generated. These effects have shown in related tests to result in a pit geometry that is virtually ideal. An ideal pit is one that has no berms or raised areas immediately surrounding the pit. The cause of these berms is not positively known, although is thought that these berm raised areas are caused by a failure to ablate all of optically active lamina from the circumferential portions of desired pit area.

It is an object of the invention to make a simple, effective and economical method of controlling the size and shape of the pits formed on optical discs to record data.

Another object of the invention is to provide a fast and inexpensive method of recording data in a controlled manner on optical discs.

Another object of the invention is to disclose an OD Mastering system capable of improved pit geometry and increased laser tracking that uses commercially available optical head, laser means and optically transparent substrate to avoid the need for expensive capital equipment found in prior OD Mastering systems.

Another object of the invention is to provide improved pit formation on optical discs by increasing the tracking and focusing potential for disc substrates such that a data modulated laser beam may accurately be focused upon and radiate from either side of the disc and cause improved consumption, ablation and sublimation of the optically active layer.

Yet another object of the invention is to lower operating expenses encountered in producing an optical disc recording or an OD Master having ideal pit geometries and increased laser tracking.

It is still a further object of the invention is to create an optical disc, used for optical disc mastering, that is easier to manufacture and track upon, and that can be recorded upon and read from either side of the disc.

These and further objects of the invention will become more readily apparent and obvious in view of the attached drawing, and description of a preferred embodiment, in light of the appended claims.

DETAILED DESCRIPTION OF THE PREFERRED EMBODIMENT

The following description is provided in order to enable any person skilled in the arts of optical disc mastering and optical disc recordings to make and use the invention, and sets forth the best modes contemplated by the inventors for carrying out the invention. The invention as disclosed, herein, can be used with a variety of embodiments. There are three categories that determine the various embodiments that can possibly be used with the present invention. The first category concerns optical tracking paths. The present invention can be embodied on optical recording disc substrates with optical tracking paths as well as those that are flat. The specific embodiments necessary for systems that record optical disc masters using discs substrates having an optical tracking path differ from those systems that record on disc substrates with no optical tracking path. The second category relates to recording data on either a first surface or a second surface of the optical disc. Here, the present invention is useful in systems that focus a laser directly on the first surface upon which laser light is incident as well as for systems that focus laser light through the disc on the second surface to record data. The third category relates to systems employing a glass disc substrate versus those that employ a plastic disc substrate. Again, the invention is useful in embodiments employing either a glass or plastic substrate. The various combinations of these three categories yields eight (8) types of embodiments that are possible with the present invention. Only those embodiments most preferred by the inventors shall be discussed herein. However, it should be readily apparent that the invention applies to optical recording systems within each of the eight categories, and that various modifications of the specific embodiments disclosed herein will be obvious to those skilled in the above referenced arts, since the principles applied by the present are generic to all eight types of embodiments.

Figure 1:
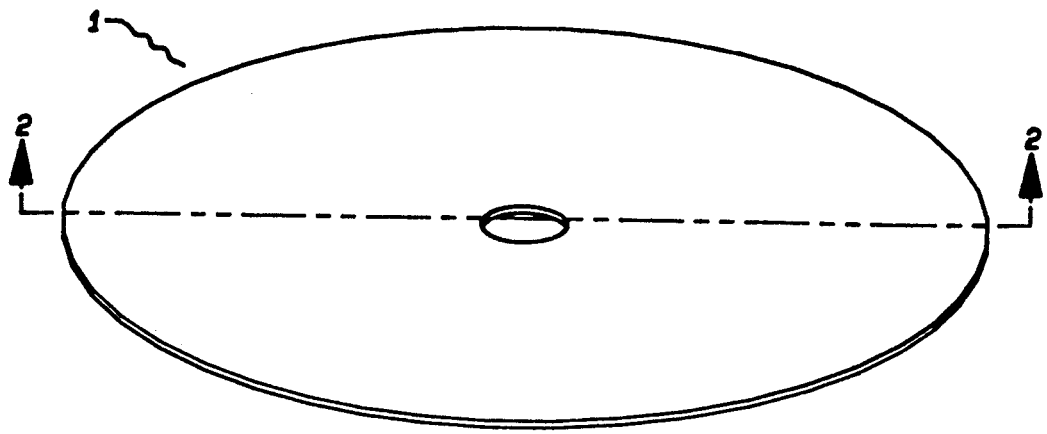
FIG. 1 illustrates an isometric view of a typical disc as used in the invention.
Figure 2:
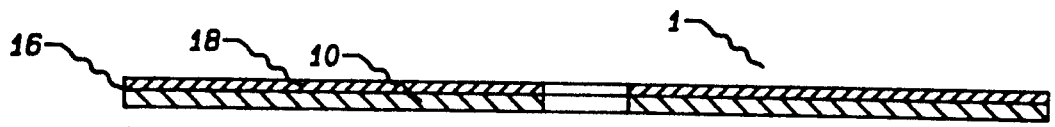
FIG. 2 is a cross sectional view of the disc shown in FIG. 1 along the diameter a'-a"

Referring now to FIG. 1, an illustration of disc 1 which is typical of an unrecorded optical disc manufactured according to the concepts of the present invention in conjunction with FIG. 2, a cross-sectional view of disc 1 as seen in FIG. 1 along the plane defined by diameter a'-a" displaying the various layers on disc 1 that constitute the present invention can be seen, partially reflective layer 16 is deposited on top of disc substrate 10 on the surface of disc 1 used to record data. Immediately on top of partially reflective layer 16 an optically active layer 18 is formed to record data within. The novel placement of partially reflective layer 16 is an essential feature of the invention since it provides increased reflectance useful in laser tracking. Additionally, it has been discovered that partially reflective layer 16 provides a means of controlling the geometry of the pits used to record data within optically active lamina 18.

Partially reflective layer 16 is formed by taking a material that is normally considered opaque and applying such an extremely thin layer on to disc substrate 10 that partially reflective layer 16 reflects and absorbs only a very small percentage of incident light. The extreme thinness of partially reflective layer 16 is also an essential part of the present invention. By applying partially reflective layer 16 in a layer having a thickness measured in tens of angstroms, most of the incident light can pass through partially reflective layer 16. However, a small percentage, on the order of one percent, of the incident light will be reflected or absorbed.

Optically active lamina 18 is used to store data on optical disc 1 as pits formed within optically active lamina 18 as a result of irradiation from laser light. The use of an optically active lamina to store data in an optical disc is well known to art of optical disc mastering. However, a novel feature of the present invention is the use of partially reflective layer 16 to improve laser tracking and control of pit geometry. The presence of partially reflective layer 16 provides an additional junction for laser beam focusing, this is a useful feature in both read and write modes. By having light pass through mediums of differing refractive indices, a reflection of the incident light occurs at each junction. Thus, light passing through substrate 10 will have a partial reflection at the junction with plurality reflective layer 16, and vice versa. Likewise light passing through partially reflective layer 16 will have a partial reflection at the junction with optically active lamina 18, and vice versa. Furthermore, the presence of partially reflective layer 16 assists in the formation of pits within optically active lamina 18 that are ideal in shape, having little or no raised ares surrounding the pit, but instead, have virtually all of optically active lamina 18 removed from the pit target area by a combination of ablation, consumption and/or sublimation. These ideal pit shapes are especially useful in mass production of duplicate optical discs from the resulting optical disc master due to the elimination of the raised "berm" areas surrounding the pits which would otherwise cause complications in the manufacturing process.

Disc substrate 10 can either have an optical tracking path molded in or etched on a the writing surface or simply be a flat disc depending on the specific embodiment. Also, disc substrate can be either a transparent polycarbonate, a transparent polymethylmethacrylate (PMMA) or any other transparent substrate capable of carrying a tracking path, such as glass would suffice for those embodiments employing an optical tracking path. Transparency of disc 10 is not an essential ingredient to the present invention in those embodiments where recording is accomplished by focusing a laser on the first surface of the disc to record data. Furthermore, conventional mastering techniques used in the optical disc industry write to optical disc surfaces without focusing through the disc substrates and the present invention is equally useful for these conventional systems.

Figure 3:
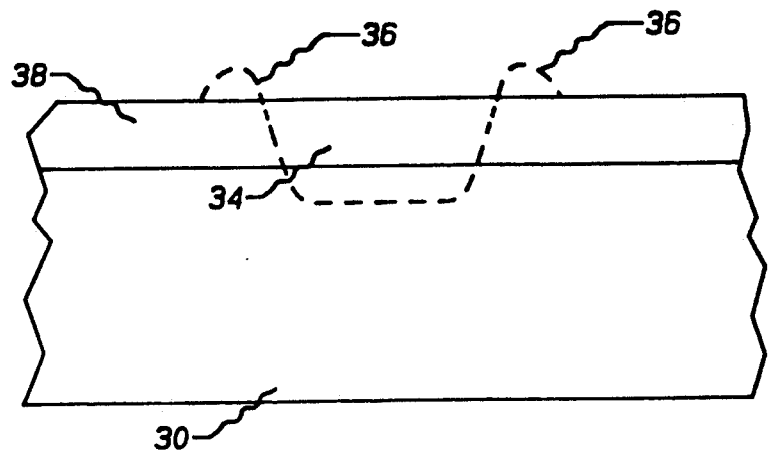
FIG. 3 illustrates resulting pits used to record data on optical discs as created using conventional methods.

Referring now to FIG. 3, a diagram of pits created using conventional disc mastering techniques employing optical disc 30 substrate having an optically active lamina 38 applied to the disc surface. The pits 34, indicated by the dotted line, that result from laser irradiation of optically active lamina 38 have berms 36 surrounding the pit 34. These berms result in undesirable problems in laser tracking and especially in reproducing the recorded disc that has these defects. Berms in a master disc create a situation where it is difficult to separate the duplicate copies from a mold, which in turn makes mass production difficult.

Figure 4:
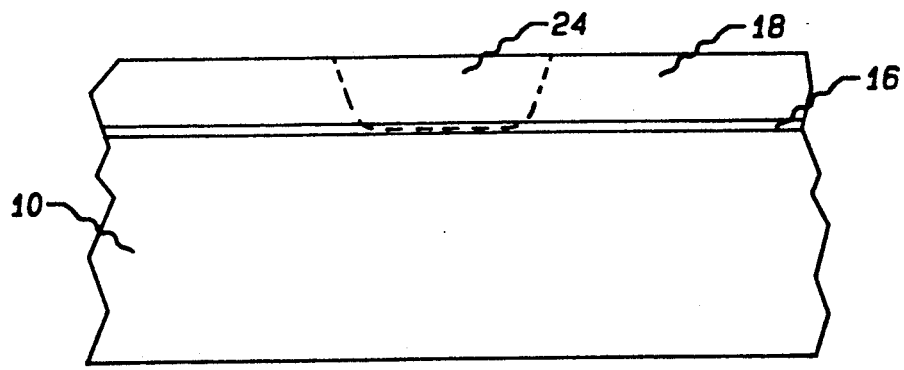
FIG. 4 illustrates resulting pits create using the present invention.

However, the present invention as seen in FIG. 4 employs partially reflective layer 16 to create pits 24, indicated by the dotted line, within optically active lamina 18 without berms, in what is widely considered through out the industry as an ideal pit shape. The only difference in the structure of the present invention compared to conventional mastering techniques discussed above, is the presence of partially reflective layer 16. Furthermore, it is believed that heat generated within optically active lamina 18 is not directly absorbed within disc substrate 10, because partially reflective layer 16 acts as a heat barrier preventing that heat generated from escaping into disc substrate 10.

Once data is fully recorded on the disc, the OD Master is completed by a step of vacuum deposition 28, or other equivalent process, wherein, a thin layer, approximately 1000 angstroms (A), of an electrically conductive and optically reflective lamina 30, is placed on the disc. In the preferred embodiment the lamina 30 is silver (Ag). Upon completion of the metalization process step, the resultant OD Master can then be electroplated by conventional means to form a stamper for replication of many identical discs.

FIRST EMBODIMENT OF THE INVENTION

Figure 5:
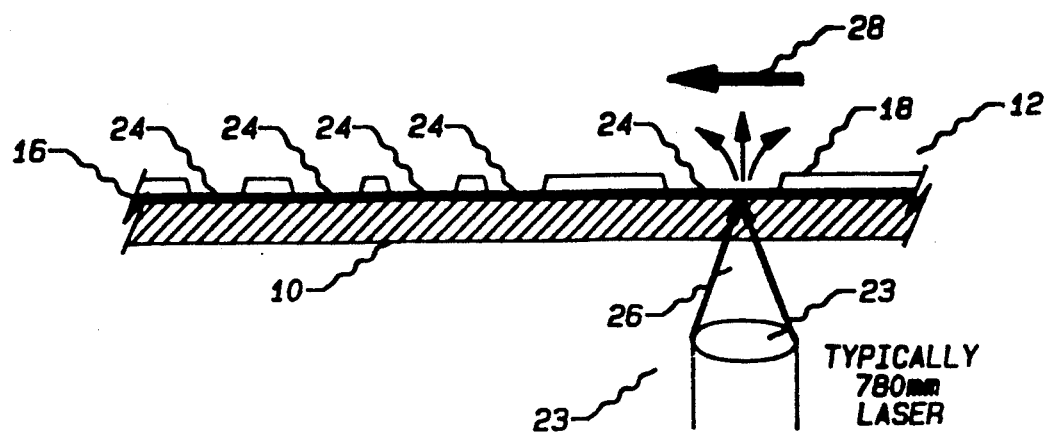
FIG. 5 illustrates the system used to record data on optical discs as envisioned within the first embodiment of the invention.

The first preferred embodiment of the invention as shown in FIG. 5, illustrates data recording by means of a disc spinning above an optical head 22 with laser beam 26 passing through disc substrate 10, which in this embodiment is a transparent polycarbonate material, to irradiate upon the optically active lamina 18. This orientation is a second surface type of orientation that is typically used in reading prerecorded Compact Discs (CDs), and reading and writing with Write Once Read Many (WORM) discs. However, the present invention writes to optical discs in a novel manner which can then be used in making a first article master disc for CD's. Conventionally, first article master discs are created by focusing a laser on the first surface of the optical disc rather than focusing a laser through the disc to write on the second surface.

Figure 6:
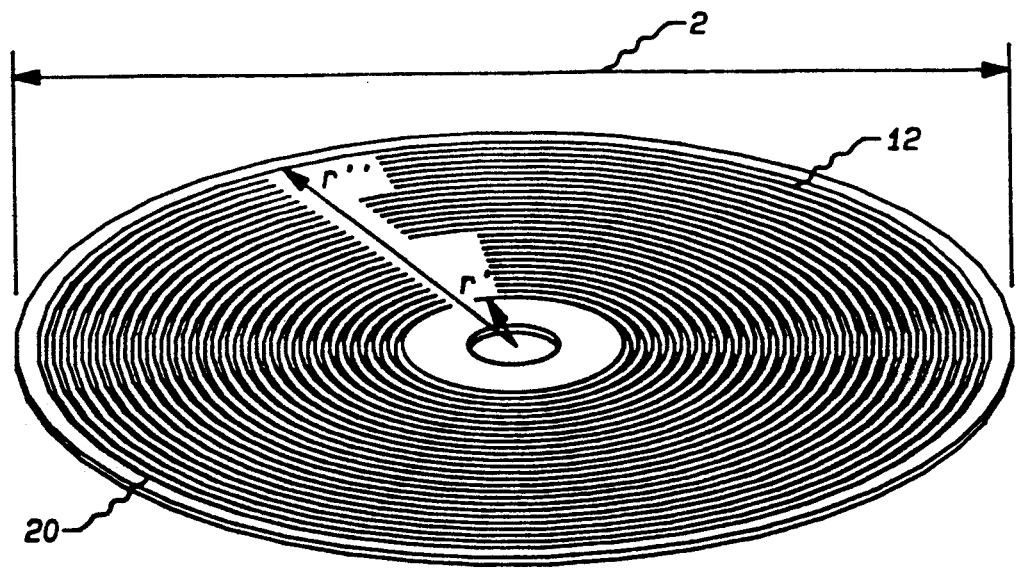
FIG. 6 illustrates a disc used in accordance with the first preferred embodiment of the present invention.

The embodiment shown in FIG. 5 employs a disc as shown in FIG. 6 that has tracking path 12 created upon the writing surface 20 of polycarbonate disc substrate 10. Partially reflective layer 16 is made from tellurium, gold or any other substance having the proper characteristics of partial reflectivity. Optically active lamina 18 is made from a nitrocellulose material containing an optically active dye compound. Without the dye the nitrocellulose is optically transparent. Here, the invention has many advantages. Partially reflective layer 16 allows for significantly improved tracking and focusing on the junction area between the disc substrate 10 and optically active lamina 18. Optical head 22 focuses laser 26 on partially reflective layer 16 and optically active lamina 18 causing the absorption of energy and a corresponding generation of heat. Conventional techniques rely on dye within optically active lamina to generate heat and as a result pits generated using these conventional methods have raised berm areas surrounding the pits. However, the present invention uses partially reflective layer 16 as well as the dye 19 (not shown) within optically active lamina 18 to generate the heat used to create pits 24 that are ideal in shape, having no raised berm areas.

Optical head 22 situated below disc substrate 10, causes laser beam 26 to pass through disc substrate 10, and finely focus on the junction area between partially reflective layer 16 and optically active lamina 18. The nitrocellulose dye compound 19 in optically active lamina 18 and the tellurium in partially reflective layer 16 reflect and absorb laser light resulting in the production of substantial heat energy in both reflective layer 16 and optically active lamina 18 which in turn generates a rapid chemical reaction in optically active lamina 18 which is thereby consumed, ablated and sublimated to form pits 24. Optical head 22 is tangentially stationary, yet tracking path 12 as indicated by arrow 28, is moving relative to optical head 22 in FIG. 6b, enabling a series of data to be recorded thereon. Optical head 22 moves radially outward in a straight line from the center to the periphery of disc 10 while tracking spiral tracking path 12 and disc 10 spins at a steadily declining rate to maintain a constant linear velocity (CLV) of approximately 1.2 meters per second for a point on the surface of the disc that is being irradiated by laser focused laser light 26.

Figure 7:
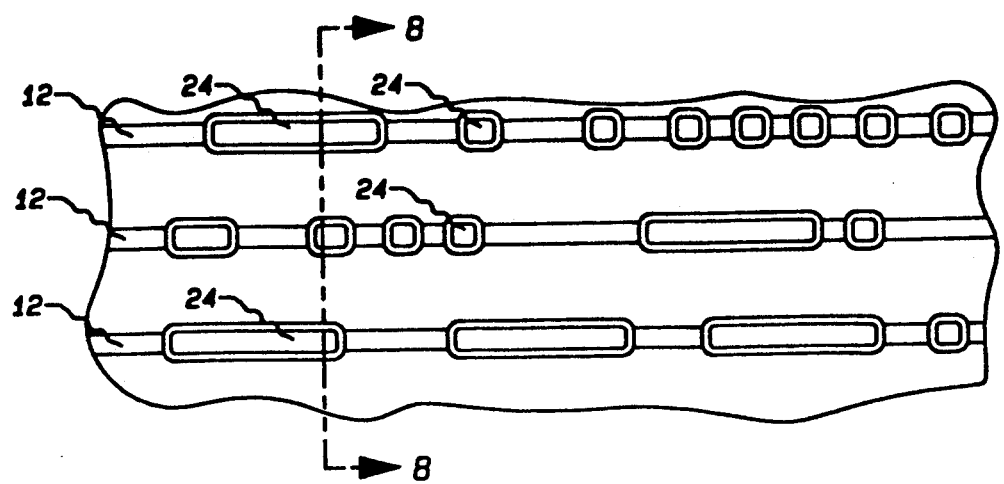
FIG. 7 is a top view illustrating recorded pits within the optically active lamina of an optical disc.

FIG. 7 illustrates a top view of data recorded along tracking path 12 as indicated by ablated pits 24 which typically are ¼ of a laser wavelength deep, 0.7 μm wide and 0,.9 to 3.3 μm long. The variance in length represents data recorded in CD format as channels bits in lengths commonly termed 3T to 11T, which represents the run length limited (RLL) code of recorded data. For tracking purposes it is desirable that the resulting groove 11 be in the realm of ¼ of a laser wavelength or 975 A (actually 650 A, 975/1.5=650 when the difference of index of refraction is taken into account).

Figure 8A:
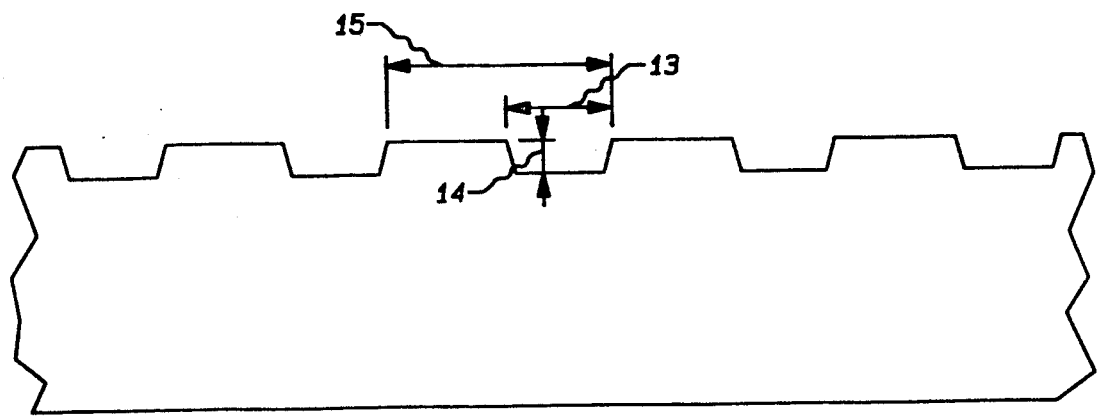
FIG. 8a illustrates the FIG. 1 an exploded cross section of the unrecorded polymer disc having an optical tracking path as used with the present invention.

FIG. 8a is an exploded view of a cross sectional area of the disc 1 displaying tracking path 12 in sufficient detail to discuss the relationship between the geometry of tracking path 12 and the creation of pits 24 used to record data. The dimensions of tracking path 12 and the resulting pits 24 are nominally as indicated in FIG. 8a discounting the possibility of any nominal residual reactive lamina not ablated. Preferably, although not necessarily limited thereto, tracking path 12 has width 13 equal to 0.78 μm, depth 14 being equal to 0.076 μm, and track pitch 15, i.e. the distance (including the "land" 38) between successive tracks or grooves, equal to 1.6 μm.

These tracking dimensions will yield a pit approximately ¼ of a laser wavelength deep.

Figure 8B:
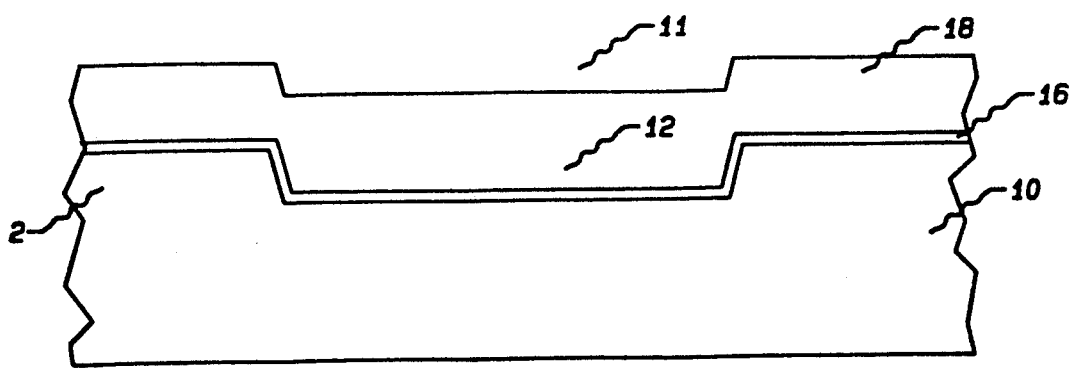
FIG. 8b is an exploded view of a grooved area of FIG. 2a displaying the layers used in the invention.

Referring to FIG. 8b, a very thin (on the order of 25 to 50 Angstroms) partially reflective layer 16 is applied to the grooved surface 2 of disc 10 upon which tracking path 12 is delineated by any of the conventional techniques capable of applying such a thin layer: sputtering technique; thermal deposition; electron beam; or chemical deposition. Immediately above reflective layer 16 is placed an optically active layer 18, approximately 130 nm to 140 nm thick, consisting of a nitrocellulose compound having a dye solution sensitive to the recording laser's wavelength.

Partially reflective layer 16 has a different index of refraction from either disc substrate 10 or optically active lamina 18. This difference in the index of refraction results in reflection which significantly increases the signal to noise ratio achieved in laser tracking of tracking path 12. The materials used in forming partially reflective layer 16 are normally considered opaque in greater thicknesses. However, the extreme thinness of partially reflective layer 16 results in partial optical transparency. Many substances can be used to create the partially reflective layer. Optimum results have been achieved, so far, by creating the partially reflective layer 16 from tellurium or gold, although, other minerals or metals could be employed as reflective layer 16. The novelty of the present invention is not the particular element used as reflective layer 16, inasmuch as the location and thinness of partially reflective layer 16.

Referring now to FIG. 8A in conjunction with FIG. 8B, the geometry and dimensions of pits 24 formed on grooved surface 2 imprinted on disc 10 can be formed to approach the shape of tracking path 12. The dimensions of tracking path 12 can be determined by various means customary in the art, including, mechanical/physical etching, photo resist etching and even continuous ablation of a laser by means of a continuous wave (CW) laser beam. Predictable results are obtained by operating within the confines of the tracking path 12 to create pits 24. Usage of optical tracking path 12 assists in obtaining the desired path and pitch for recorded data. The control of pit geometry results from conjunctive variance of the thickness of partially reflective layer 16 and optically active lamina 18 with laser power focus and wavelength. By having a laser focus on the area defined by partially reflective layer 16 and optically active lamina 18, heat is generated consistently throughout the target area. The affect is that none or very little of optically active lamina 18 remains within the area of tracking path 12 that has been subjected to laser irradiation. Pit formation leaves only the grooved walls 20 or a nominal residual layer of optically active lamina 18, with essentially no surrounding berm area, yielding pits that are ideal in shape.

The optical laser head 22 used in the foregoing process is preferably contains a 780 nm wavelength laser, although other wavelength lasers could be used, mounted in an optical head which has a single spot tracking capability. It should be understood that different laser wavelengths would dictate different groove and pit geometry. The optical head 22 has a lens 23 with a numerical aperture of 0.6 such that the laser may be focused to a spot on tracking path 12 which spot has a diameter approximately equal to the width, 0.6 μm, of the groove when laser beam 34 passes through polymer substrate 10. Once lens 23 is focused, optical tracking path 12 provides a means by which optical laser head 22 can track on disc 10 and follow the spiral path necessary for optical disc encoding. The operating system utilizes conventional servo means to adjust the speed of spinning disc 10 to the radial translational movement of optical head 22 in such fashion that laser beam 26 is able to follow the spiral tracking path 12 with a constant linear velocity (CLV) from the inner most groove radius (r') to the outermost groove radius (r'').

The laser diode used in the invention is a diode having sufficient power to ablate the optically active lamina. The diode during recording is modulated with the desired data stream and by such means forms the series of ablated pits 24 of various length aligned along tracking path 12.

SECOND PREFERRED EMBODIMENT OF THE INVENTION

Figure 9:
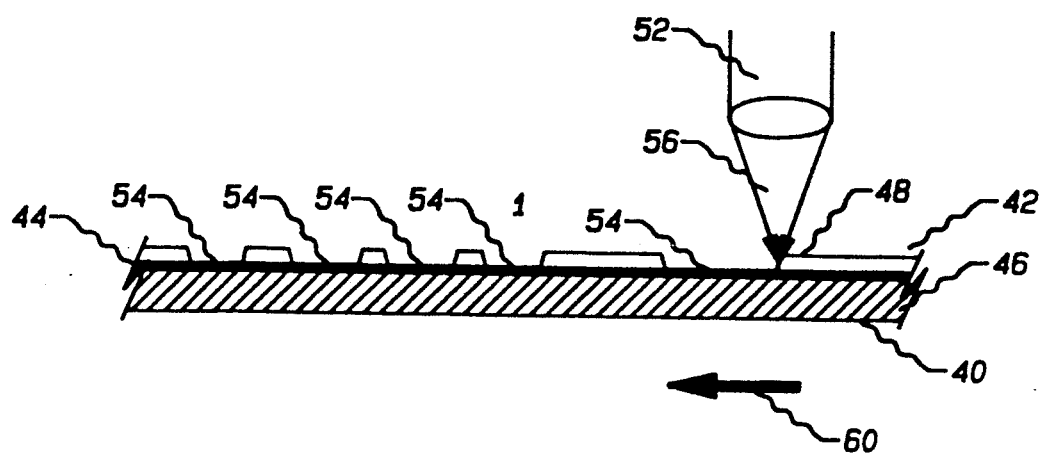
FIG. 9 illustrates the system used to record data on optical discs as envisioned within the second embodiment of the invention.

The second preferred embodiment of the invention as shown in FIG. 9, illustrates data recording by means of a disc spinning below an optical head 52 with laser beam 56 focusing on optically active lamina 48 from above disc 40. This configuration is similar to those used in conventional disc mastering techniques, and similarly employs a disc substrate 40 made from highly polished glass, having one side used as a writing surface 44. A very thin, partially reflective layer 46 (on the order of 30-50 Angstroms) is deposited on surface 44, in accordance with the overall concept of the invention. Optically active lamina 48 is then deposited in a uniform layer on partially reflective layer 46. As can seen there are similarities between this embodiment and the first embodiment in terms of the layers used to construct the disc. However, the second embodiment employs a glass disc substrate 40 with laser beam 56 focused from above disc 40 onto disc surface 44 where there is no optical tracking path. The second embodiment is, therefore, illustrative of the usefulness of the present invention in conventional systems used to make first article master discs. By focusing a laser on the first surface of the optical disc rather than focusing through the disc, as in the previous embodiment, the invention is operative within these conventional systems.

As in the first embodiment, partially reflective layer 46 is preferably made from tellurium or gold, and optically active lamina 48 is made from nitrocellulose material containing a dye compound to make it optically active. Again as in the first embodiment, partially reflective layer 46 allows for significantly improved tracking and focusing on the area including disc substrate 40 and optically active lamina 48. Optical head 52 focuses laser 56 on partially reflective layer 46 and optically active lamina 48 causing absorption of energy and a resulting generation of heat. Conventional techniques rely on dye within optically active lamina to generate heat. However, the present invention uses partially reflective layer 46 as well as the dye 49 (not shown) within optically active lamina 48 to generate the heat used to create pits 54.

The nitrocellulose dye compound 49 in optically active lamina 48 and the tellurium in partially reflective layer 46 reflect and absorb laser light resulting in substantial heat energy in both reflective layer 16 and optically active lamina 48 which in turn generates a rapid chemical reaction within optically active lamina 48, which causes consumption, ablation and/or sublimation of optically active lamina 48 to form pits 54. As in the first embodiment, and in accordance with the principles of the invention, this heat is distributed within the target area in a manner that results in pits being formed are without berms surrounding pits 54, in an ideal shape.

A major difference in this embodiment when compared to the first embodiment, is the fact that no optical tracking path exist on the unrecorded disc. The data is recorded in a pattern that ca be used as a tracking path for reading of the recorded data by a read laser. To accomplish this, laser source 52 appears stationary to disc 40 during recording but actually moves radially outward in a straight line from the center to the periphery of disc 40 while disc 40 spins at a steadily declining rate to maintain a constant linear velocity (CLV) of approximately 1.2 meters per second for a point on the surface of the disc that is being radiated by laser beam 58. Pits 54 can be recorded in preferably a spiral manner.

Although the embodiments most preferred by the inventors for making optical disc recordings have been detailed here, it should be understood that the invention is not limited thereto, and that modifications to the invention as disclosed herein should be obvious to those skilled in the relevant arts. Therefore, these obvious modifications should be considered to be within the scope of the invention as defined in the appended claims.

What is claimed is:

1. A process for recording optical disc masters from which an optical disc stamper can be made comprising the steps of:
    manufacturing an optical disc substrate having at least one surface used for recording data;
    creating a partially reflective layer on said surface, said layer having a thickness of less than about 50 Angstroms, said partially reflective layer being constructed from an opaque material and applied in such an extremely thin layer that said partially reflective layer is substantially transparent;
    applying a homogeneous layer of an optically active lamina to said partially reflective layer on said surface;
    optically writing data within said optically active lamina by focusing a laser to form a series of pits within said optically active lamina; and
    applying a conductive lamina to said active lamina, thereby creating an optical disc master.

2. The process as defined by claim 1 wherein said step of optically writing further consists of focusing a data modulated laser in an area defined by said partially reflective layer and said optically active lamina.

3. The process as defined in claim 2 wherein said surface has an optical tracking path delineated, thereon.

4. The process as defined in claim 3 wherein the step of optically writing data consists of focusing said laser on said optical tracking path to form said pits.

5. The process as defined by claim 2 wherein said material used to create said partially reflective layer is a mineral.

6. The process as defined by claim 2 wherein said material used to create said partially reflective layer is a metal.

7. A process according to claim 2, wherein said disc substrate is a polymer.

8. A process according to claim 2, wherein said laser means is disposed opposite said optically active lamina and focuses through said disc substrate to form pits within said optically active lamina.

9. A process according to claim 2, wherein said disc substrate is a glass.

10. A process according to claim 2 wherein, due to said partially reflective layer, said step of optically writing creates pits within said optically active lamina without creating raised areas surrounding said pits.

11. A process for recording optical disc masters comprising the steps of:
- making a transparent disc substrate having at least one writing surface;
- forming partially reflective means on said surface, said partially reflective means being formed from a material typically considered opaque made in such an extremely thin layer that it is substantially transparent;
- applying a homogeneous, optically active lamina to said partially reflective means;
- optically writing data within said active lamina by focusing a laser through said transparent substrate and said substantially transparent partially reflective means upon said optically active lamina to form series of pits, within said optically active lamina, said pits having sufficient definition to enable their reproduction by electroforming;
- controlling the geometry of said pits by variance of said partially reflective layer thickness; and
- applying a conductive lamina to said active lamina, thereby creating an optical disc master.

12. The process as defined in claim 11 wherein said optical disk substrate contains an optical tracking path.

13. A process according to claim 12, wherein said pits formed in said optically active lamina are formed within said tracking path.

14. A process according to claim 12, wherein said pits are formed within an area between adjacent portions of said tracking path.

15. A disc shaped information carrier for optically recording data in the form of pits of sufficient definition to enable reproduction by electroforming comprising:
- a transparent, circular planar member used as an optical disc substrate, said member having at least one surface for recording data thereon, said surface containing a tracking path delineated thereon;
- partially reflective means deposited on said surface for controlling the geometry of pits formed in response to laser irradiation, said partially reflective means being deposited in such an extremely thin layer on the order of less than about 50 angstroms that it is substantially transparent; and
- a homogeneous, optically active lamina applied to said partially reflective means, said optically active lamina being constructed from a volatile substance capable of forming a series of pits as a result of irradiation from laser light.

16. The invention defined by claim 15 further comprising a reflective and conductive lamina applied to said optically active lamina after data has been recorded within said lamina, thereby forming an optical disc master.

17. The invention of claim 15 wherein said partially reflective layer consists of a substance having high radiation absorption properties.

18. The invention defined by claim 17 wherein said substance consists substantially of tellurium.

19. The invention of claim 15 wherein said partially reflective layer consists of a metallic substance.

20. The invention defined by claim 19 wherein said metallic substance consists substantially of gold.

21. The invention defined by claim 15 wherein said optically active lamina comprises nitrocellulose.

22. The invention defined by claim 21 wherein said optically active lamina contains an optically active dye to absorb laser radiation and generate heat therefrom.

23. In an optical recording medium employing an optical disc substrate having an optical tracking path delineated on one side, thereof, said path delineated side being covered with an optically active lamina having properties capable of reacting to laser irradiation to form pits in said lamina, wherein the improvement comprises a partially reflective layer sandwiched between said disc substrate and said optically active lamina, said partially reflective layer being made form an opaque material applied in such an extremely thin layer that it is substantially transparent and operative in providing improved laser beam tracking and controlling pit geometry.

24. The invention defined by claim 23 wherein said partially reflective layer consists substantially of tellurium.

25. The invention defined by claim 23 wherein said partially reflective layer substantially consists of a metal.

26. The process as defined in claim 3 wherein the step of optically writing data consists of focusing said laser on a land area of said surface adjacent to said optical tracking path to form said pits.

27. The process as defined in claim 2 wherein said surface is a flat surface prior recording of data.

28. The process as defined in claim 27 wherein the step of optically writing consists of focusing said laser on said surface to form said pits in a manner that can be used for tracking during read operations.

* * * * *